United States Patent Office.

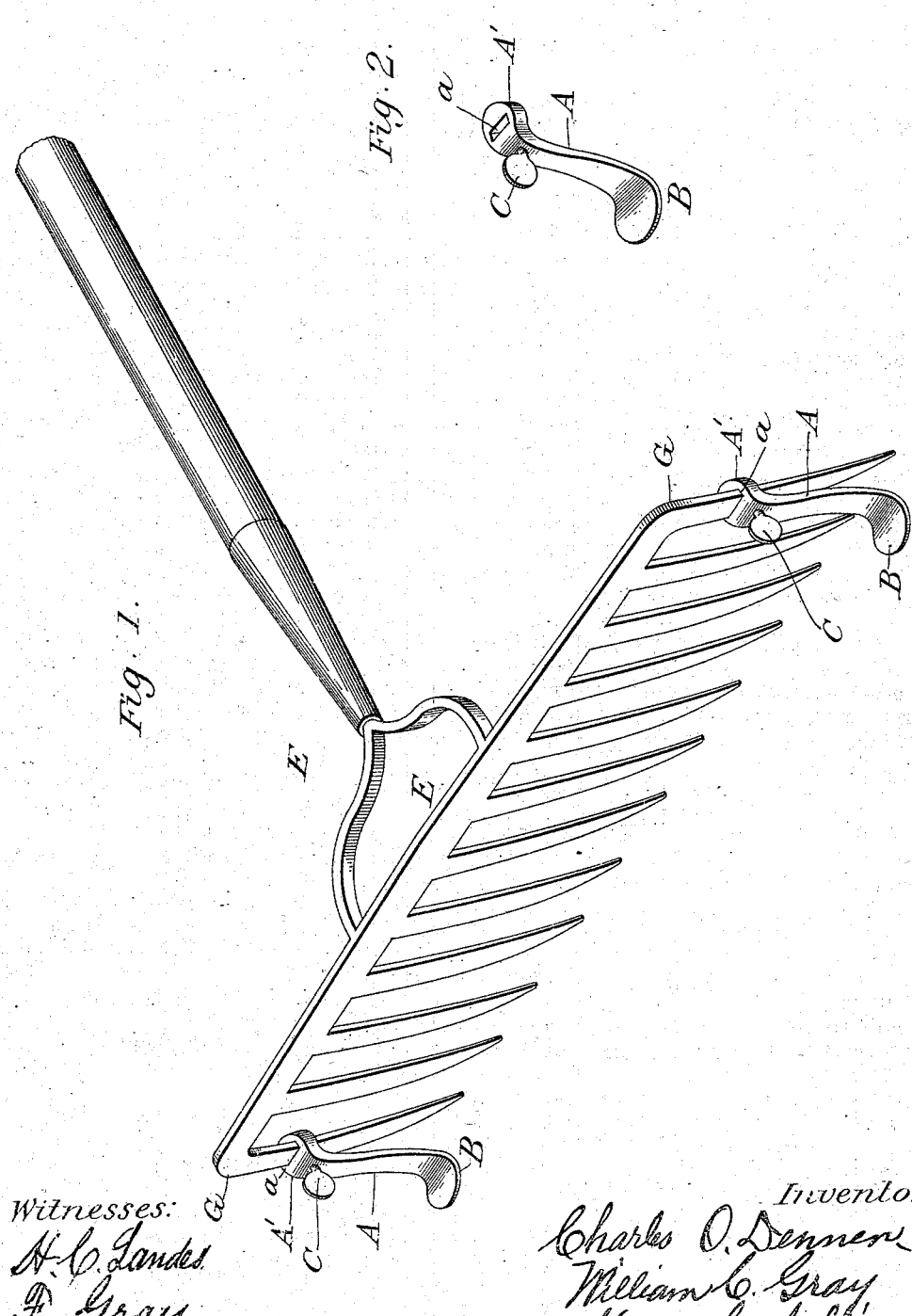

CHARLES O. DENNEN, WILLIAM C. GRAY, AND HOMER C. NELLIS, OF PIQUA, OHIO.

RAKE SHOE OR RUNNER.

SPECIFICATION forming part of Letters Patent No. 293,210, dated February 5, 1884.

Application filed December 17, 1883. (No model.)

*To all whom it may concern:*

Be it known that we, CHARLES O. DENNEN, WILLIAM C. GRAY, and HOMER C. NELLIS, all citizens of the United States, residing at Piqua, in the county of Miami and State of Ohio, as joint inventors have invented a new and useful adjustable shoe or runner by which, in combination with the rake, any iron, steel, or wooden hand or field rake may be so adjusted as to control the depth the teeth of the rake shall enter the soil; and we do declare the following to be a full, clear, and exact description of the invention, such as will enable others to make and use the same, reference being had to the accompanying drawings, and to letters and figures of reference marked thereon, which form a part of this specification.

Our invention relates to an adjustable shoe or guard for garden, field, and lawn rakes and any toothed agricultural implements made for raking or harrowing the soil; and it consists in a metallic shoe or guard adapted to be secured to the rake or harrow teeth.

The object of the invention is to regulate the depth that the teeth of the rake shall enter the soil and control its work. Thus in a lawn-rake it prevents the rake-teeth from tearing the roots of the grass during the operation of raking, and to accomplish the same the shoes are placed on the outer teeth, and are so adjusted that the points of the teeth will clean the sod without penetrating the ground, thus leaving the grass roots undisturbed.

Heretofore there have been rake-heads and harrow-heads provided with holes at their extremities, in which screen-shanks are inserted, with a guard to elevate the rake-teeth above the ground. Again, there have been guards placed upon rake-teeth made of spring-wire. In either case these attachments must be applied to a particular form of rake-teeth. In our attachment it can be applied to different-sized teeth and to any shaped teeth made for rakes or harrows, and held in place when so applied.

Referring to the accompanying drawings, Figure 1 is a perspective view of a rake with our attachment applied thereto, and Fig. 2 a detail perspective view of said shoe or attachment.

E represents an ordinary rake-head provided with the usual number of teeth. The shoes A are secured to the outer rake-teeth, G. The shoe A has the curved lower end, B, the shoulder A', and set-screw C. The shoulder or curved portion A' has a rectangular or other suitable opening, $a$, by means of which the shoes are slipped and adjusted on said teeth G. The set or thumb screw C enters the shoulder A' and presses against the teeth G.

It is obvious that these shoes can be placed on any rake-teeth or any harrow, drill, or toothed agricultural implements used where the depth of their teeth may be regulated and controlled, as the shoes can be made of any size, shape, and strength, so as to be attachable to any kind of teeth, and can be slipped up or down on the teeth and held by the set-screw or other suitable clamping device. They are preferably made of malleable or cast iron, and are cheaply made and quickly adjusted.

Having thus described our invention, what we claim as new, and desire to secure by Letters Patent, is—

A detachable and adjustable shoe or guard for rake or harrow teeth, consisting of a shank, A, curved or bent end B, and perforated shoulder $a$, provided with a set-screw or other suitable clamping device, substantially as and for the purposes set forth.

In testimony whereof we affix our signatures in presence of two witnesses.

CHARLES O. DENNEN.
WILLIAM C. GRAY.
HOMER C. NELLIS.

Witnesses:
WALTER D. JONES,
U. H. JONES.